United States Patent [19]

Mellgren

[11] Patent Number: 4,653,555
[45] Date of Patent: Mar. 31, 1987

[54] FELLER-FORWARDER

[75] Inventor: Per-Gustaf Mellgren, Beaconsfield, Canada

[73] Assignee: Forest Engineering Research Institute of Canada, Pointe Claire, Canada

[21] Appl. No.: 689,926

[22] Filed: Jan. 9, 1985

[30] Foreign Application Priority Data

Jan. 9, 1984 [CA] Canada .................................. 444971

[51] Int. Cl.$^4$ .............................................. A01G 23/08
[52] U.S. Cl. .................................. 144/3 D; 144/336; 144/34 R
[58] Field of Search .................... 144/2 Z, 3 D, 34 R, 144/335, 336

[56] References Cited

U.S. PATENT DOCUMENTS 3,659,635  5/1972  Mellgren ............................ 144/3 D
4,445,552  5/1984  Hyde et al. ........................ 144/34 R
4,446,897  5/1985  Kurelek ............................. 144/34 R

FOREIGN PATENT DOCUMENTS 581907  11/1977  U.S.S.R. .............................. 144/3 D

Primary Examiner—W. D. Bray
Attorney, Agent, or Firm—Charles E. Brown; Charles A. Brown

[57] ABSTRACT

A tree cutting and collecting apparatus. The apparatus comprises a boom and means intermediate the ends of the boom for use in mounting the apparatus on a vehicle for rotation about an upright axis. A circular saw is mounted at one end of the boom to cut down trees as the apparatus is rotated. A tree collecting basket forms part of the apparatus, the basket located behind the saw, and above and generally parallel to the boom. Pusher means are provided adjacent the saw for toppling trees just cut by the saw into the basket.

The invention is also directed toward a machine incorporating the above apparatus, and to an off-road vehicle which can be used with the apparatus.

3 Claims, 6 Drawing Figures

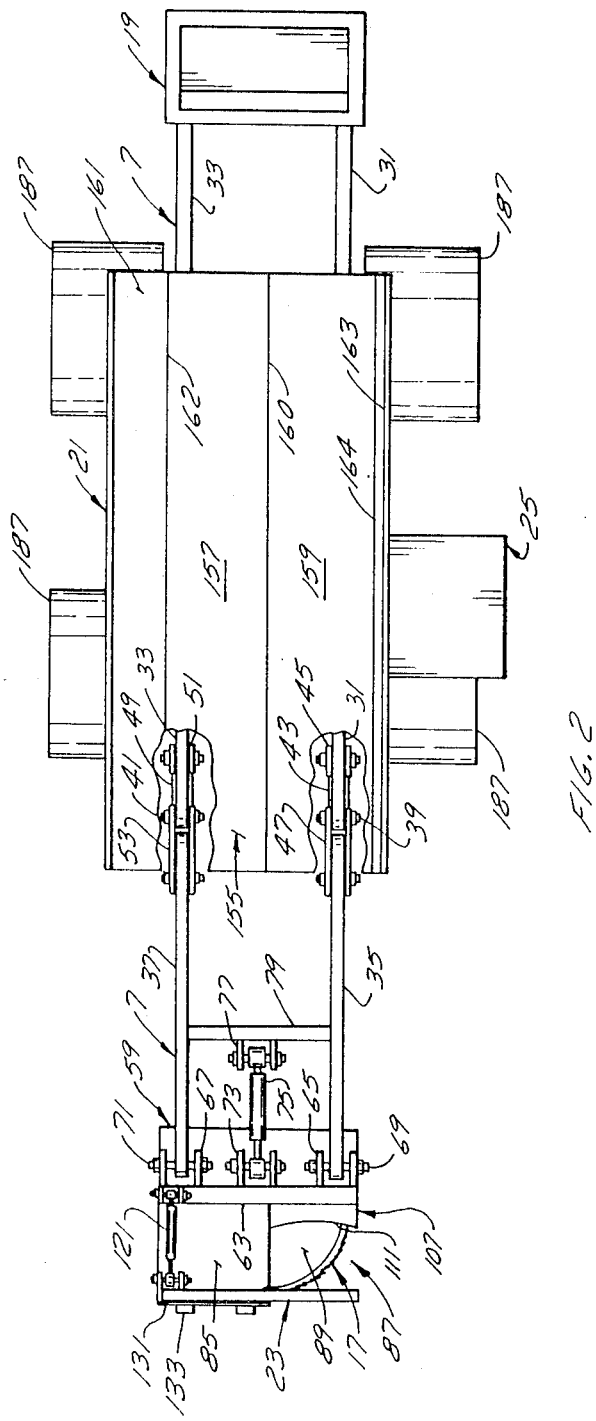

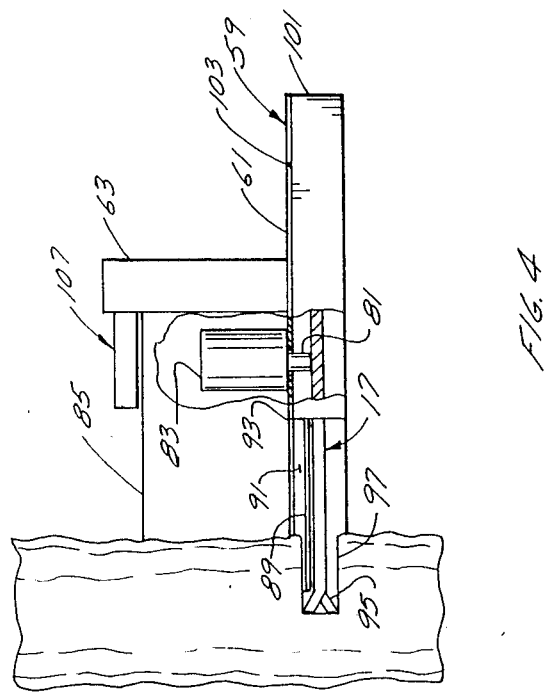
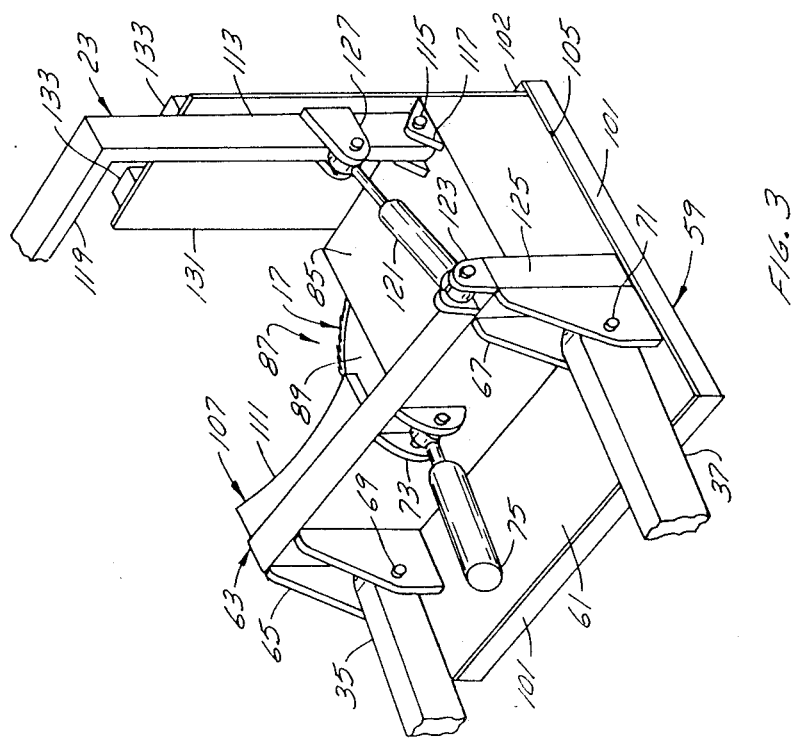

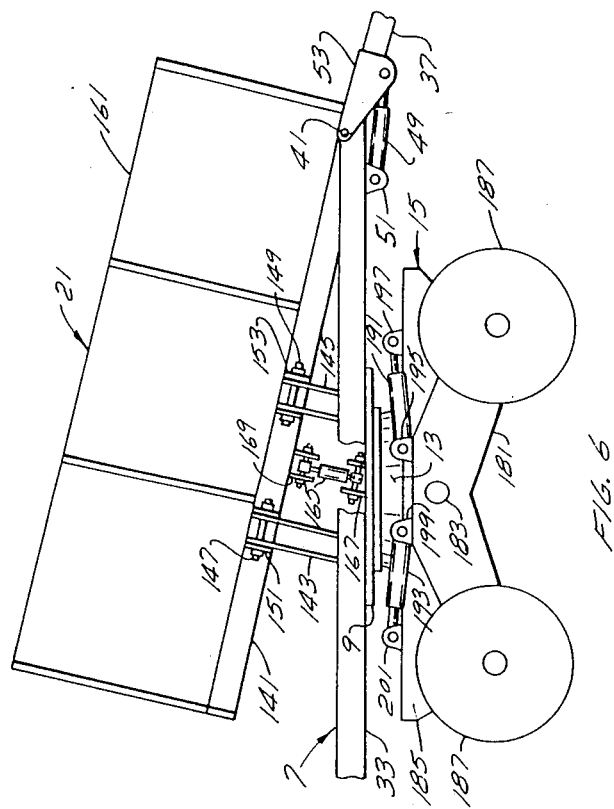
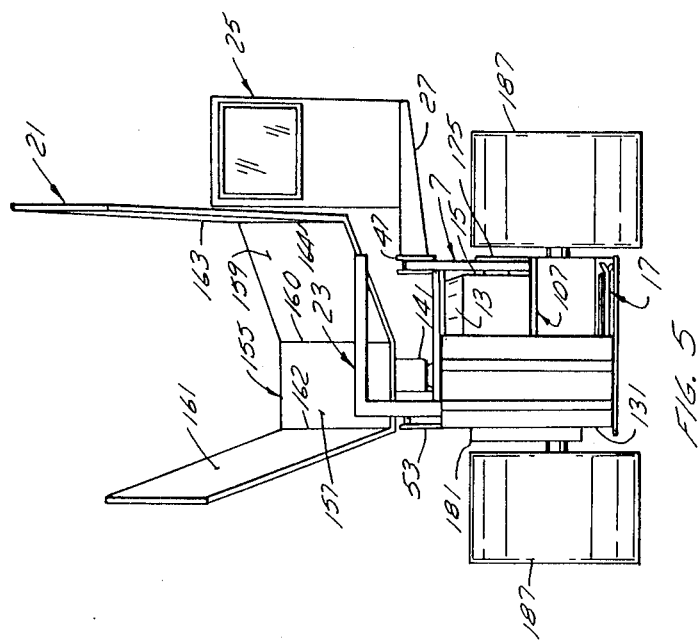

FELLER-FORWARDER

BACKGROUND OF THE INVENTION

1. Field of the Invention

This invention is directed toward a tree cutting and collecting apparatus. The invention is also directed toward a tree cutting and collecting machine incorporating the cutting and collecting apparatus. The invention is further directed toward an improved off-road vehicle which can for a part of the tree cutting and collecting machine.

2. Description of the Prior Art

Machines for use in felling and collecting trees are known. These machines, known as feller-bunchers, usually have an articulated arm or boom mounted on a tracked or wheeled vehicle. A tree felling and collecting or bunching head is mounted at the end of the arm. The arm is manipulated by an operator on the vehicle to position the head to cut a tree. The head is then operated to grip and cut the tree, or to cut and grip the tree. The head is then further operated to grip and store the cut tree while manipulating the arm to position the head to cut another tree. The procedure is repeated until the head holds a small bunch of trees. The arm is then moved to unload the bunch of trees from the head, and another load of trees is then cut and collected. The above procedure is quite slow however since every tree that is cut must be gripped and stored by the head before another tree can be cut. Often the head must be operated to grip the tree before it can be cut, and then separate gripping means must be operated to store the cut tree. The load of trees that the head can carry is quite small. Thus frequent 180° swinging to unload is required increasing the overall cutting time. The articulated arm, and the head, require many hydraulic components to carry out their functions thus increasing the complexity of the machines and their cost. A further disadvantage of known feller-bunchers is the fact that the trees held in storage by the head interfere with the next tree to be cut. The crowns of the trees being held tend to spread out and interfere with the crown of the next tree to be cut, or with the crowns of trees adjacent the cutting area. The interference places additional stress on the arm as it tries to manoeuvre the head into position to cut the next tree.

On rough terrain, it is often difficult to position the tree cutting and collecting machine level enough to properly harvest trees. Often a great deal of vehicle manipulation and/or arm manipulation is required to properly position the head. Some vehicles employ platforms on which the arm, and the head it carries, are mounted. The level of the platform can be adjusted relative to the vehicle on rough terrain. However a complicated platform mounting and moving arrangement is required on such vehicles.

It is also known to provide machines for cutting and collecting trees which eliminate the articulated arm and the felling the gripping head thereby simplifying the operation of the machine. One such machine is shown in C.P. No. 898,661 and comprises a vehicle having a crib thereon for collecting cut trees, and a circular saw mounted horizontally in front of the vehicle for cutting trees. The vehicle is driven forwardly to have the saw cut the trees. The cut trees topple rearwardly into the crib. Means are provided on the vehicle to help direct the cut trees into the crib. The vehicle with the crib can carry a much larger load than a vehicle with a cutting and bunching head, and needs fewer hydraulic components. However a great deal of travelling of the entire vehicle is required to cut the trees which consumes more fuel. Such a machine can only be used on even ground. Therefore it has a limited market.

SUMMARY OF THE INVENTION

It is the purpose of the present invention to provide a tree cutting and collecting apparatus which is relatively inexpensive to purchase, and to operate. It is another purpose of the present invention to provide a tree cutting and collecting apparatus, and particularly a machine incorporating the apparatus, which is simpler in operation, and which has a greater tree collecting capacity, than some known types of machines while still maintaining a relatively high production rate. The improved apparatus, or a machine incorporating the apparatus, could have a production rate that is twenty-five to fifty percent higher that the production rate of machines employing articulated arms or booms. It is yet another purpose of the present invention to provide a machine which can be simply and easily levelled on rough terrain.

In accordance with the present invention there is provided an apparatus having a boom, and means intermediate the ends of the boom for use in mounting the apparatus on a vehicle for rotation about an upright axis. The boom carries a large, heavy circular saw at its front end that is mounted for rotation abou an upright axis. The apparatus includes a basket behind the saw, which extends generally parallel to, and above, the boom for collecting trees cut by the saw. Pusher means are provided on the boom at its front end adjacent the saw for toppling the cut trees into the basket.

Power supply means for the apparatus, and even for the vehicle on which the apparatus is mounted, can be mounted at the other end of the boom. The power supply means provides a balancing force for the weight of the saw and the pusher means at the front end of the boom. The apparatus can also carry an operator's cab adjacent the boom.

The machine of the present invention includes a vehicle on which the above apparatus is mounted for rotation about an upright axis. The vehicle has a chassis on which the apparatus is mounted and a support beam pivotally mounted on each side of the chassis. At least one wheel is mounted at each end of each support beam. In accordance with the present invention simple means are provided on the vehicle to connect the support beams to the chassis in a manner to permit the chassis to be levelled relative to the beams on rough or uneven terrain. Thus the apparatus mounted on the chassis can be easily placed in a better operating position.

In operation of the machine, the apparatus is swung generally horizontally about its rotational mounting on the vehicle. The power supply means on the rear end of the boom helps balance it on the vehicle making the apparatus easier to swing. In addition, the trees collected in the basket are generally well balanced over the vehicle again making it easier to swing the apparatus. As the apparatus is swung, the large, heavy, circular saw at its front end moves in an arc and cuts down each tree encountered. The vehicle can be moved a short distance forwards or backwards to position the saw to cut each tree encountered by the swinging apparatus. Each tree is cut without being gripped, and is collected in the basket without being gripped. Thus cutting and collecting is quickly accomplished. The cut trees each rest momentarily on the saw, or on a butt plate over the saw, and are then toppled by the pusher means, in a radial direction toward the axis of rotation of the swing, into the basket. Pushing the cut tree in a radial direction minimizes any crown interference allowing the tree to be easily toppled into the basket. The trees collected in the basket do not interfere with the swinging of the apparatus, or with cutting the next tree to be harvested.

The basket on the apparatus allows a greater number of trees to be collected before unloading thus speeding up harvesting time as compared to known feller-bunchers. The basket can be mounted on the apparatus in a manner permitting it to be tipped sideways thus speeding up unloading. Preferably the basket slopes down toward its front end. This facilitates loading of trees into the basket by toppling and lowers the loaded center of gravity of the vehicle. The basket is also preferably shaped to move the collected trees a short distance transversely of the basket so as to have the collected trees avoid interference with trees to be cut. A stop plate is provided at the front end of the boom to receive the butt ends of the trees collected in the sloping basket. The stop plate prevents the trees from sliding forwardly too far out of the basket and interfering with uncut trees as the apparatus swings through a cutting arc.

The apparatus can be easily mounted on existing vehicles, which may, in some cases require modification. Preferably however the simple, wheeled vehicle previously described is provided to carry the apparatus.

The apparatus employs a large, heavy, circular saw to cut the trees. Such saws are known as shown in Canadian Pat. No. 1,029,283 by way of example. The saws permit trees to be quickly cut without holding them and without damaging them. Since the trees can be cut without holding them, the cutting operation is much quicker than when employing a conventional feller-buncher with a cutting and buncher head. However, with the known apparatus or machines employing circular saws, the problem of collecting the cut trees still exists. The present invention solves this problem by mounting the saw on a boom and collecting the cut trees in a basket behind the boom without requiring the use of grippers. The cutting advantage obtained using a large, heavy, circular saw are still retained, while simplifying the operator's task and speeding up the tree collecting operation.

The invention is particularly directed toward a tree cutting and collecting apparatus which comprises a boom and means on the apparatus intermediate the ends of the boom for use in mounting the apparatus on a vehicle for rotation about an upright axis. A circular saw is mounted at one end of the boom to cut down trees as the apparatus is rotated. Tree collecting means are provided on the apparatus behind the saw, extending generally parallel to, and above, the boom, for collecting trees cut by the saw.

The apparatus includes means at the one end of the boom for pushing trees cut by the saw into the collecting means. The apparatus also includes stop means at the one end of the boom for stopping the trees collected in the collecting means from sliding forward past the front of the apparatus.

The invention is also directed toward a machine for cutting and collecting trees which comprises an off-road vehicle and a tree cutting and collecting apparatus mounted on the vehicle. The apparatus has a boom with means on the apparatus intermediate the ends of the boom for mounting the apparatus on the vehicle for rotation about an upright axis. A circular saw is mounted at one end of the boom to cut down trees as the apparatus is rotated. Collecting means are provided on the apparatus behind the saw, extending generally parallel to, and above, the boom, for collecting trees cut by the saw.

The invention is further directed toward an off-road vehicle having a chassis with a support beam pivotally mounted to each side of the chassis. At least one wheel is mounted at each end of each support beam. Means are provided on the vehicle between each beam and the chassis for moving the chassis toward a level position when the wheels rest on uneven ground.

BRIEF DESCRIPTION OF THE DRAWINGS

FIG. 2 is a top view of the machine with portions broken away to show details;
FIG. 3 is a perspective view of the felling platform;
FIG. 4 is a partial cross-section view of the felling platform during the cutting of a tree;
FIG. 5 is a gront view of the machine;
and
FIG. 6 is a detailed left side view of the machine, again with a portion broken away to show detail.

DESCRIPTION OF THE PREFERRED EMBODIMENTS

Figure 1:
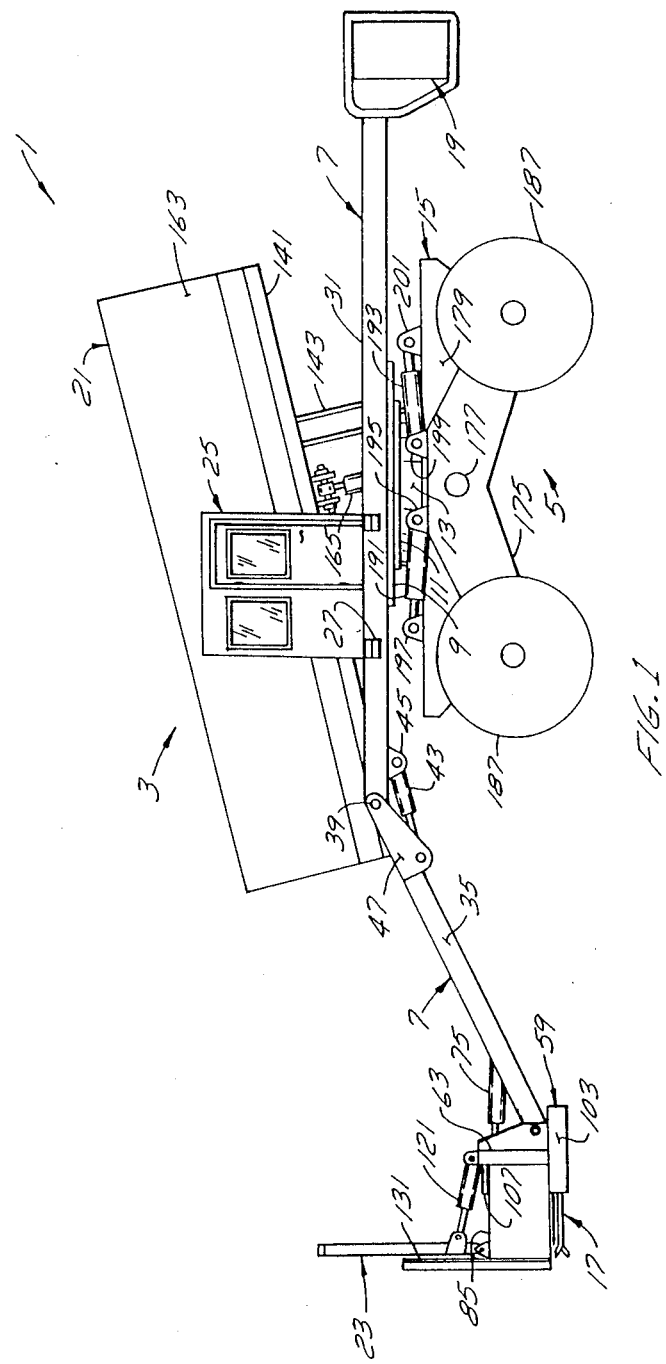
FIG. 1 is a right side view of the machine.

The tree cutting and collecting machine 1 of the present invention, as shown in FIGS. 1 to 3, has a tree cutting and collecting apparatus 3 that is adapted to be mounted on a vehicle 5 for rotation about an upright axis.

The tree cutting and collecting apparatus 3 has a boom 7. Means are provided on the apparatus intermediate the ends of the boom, for use in mounting the apparatus 3 on the vehicle 5 for rotation about an upright axis. The mounting means can comprise a base 9 fixed to the bottom of the boom 7 intermediate its ends, the base 9 having a downwardly directed collar 11 adapted to be rotatably mounted on a circular mounting base 13 on the chassis 15 of the vehicle 5.

A circular saw 17 is mounted at the front end of the boom 7 for rotation about a generally upright axis when in operative position. The saw 17, when rotated, cuts tree as the apparatus 3 is rotated or swung about on the vehicle 5. A power supply means 19 is mounted at the rear end of the boom 7 for supplying power to the apparatus 3, and also preferably to the vehicle 5.

Tree collecting means are mounted on the apparatus 3, preferably on the base 9, behind the circular saw 17. The tree collecting means preferably comprise an elongated crib or basket 21 located just above, and generally parallel to, the beam 7. Means are provided on the apparatus 3 for pushing trees rearwardly into the basket 21 as they are cut by the circular saw 17. The pushing means can comprise an arm 23 mounted at the front end of the boom 7, adjacent to the saw 17, and movable to push a cut tree into the basket 21. An operator's cab 25 can be mounted on the apparatus 3. The cab 25 is mounted from one side of the boom 7 by cantilevered struts 27.

In more detail, as shown in FIGS. 1 and 2, the boom 7 has a pair of straight, parallel members 31, 33 extending forwardly and rearwardly of the base 9 and fixed generally at their central portions to the base. The power supply means 19 is mounted to the rear ends of the boom members 31, 33. A pair of boom arms 35, 37 is pivotally mounted at one end to the front end of boom members 31, 33 respectively by horizontal pivot pins 39, 41. A first hydraulic cylinder 43 extends pivotally between brackets 45 on boom member 31 and brackets 47 on boom arm 35. A second hydraulic cylinder 49 extends pivotally between brackets 51 on boom member 33 and brackets 53 on boom arm 37. The first and second hydraulic cylinders 43, 49 allow the boom arms 35, 37 to be raised or lowered, in unison, with respect to boom members 31, 33.

A felling platform 59, as shown in FIG. 3, carrying the circular saw 17 and the pushing arm 23, is mounted at the front of boom arms, 35, 37. The felling platform 59 has a flat base 61 with an upright support member 63 extending transversely across the base 61 generally midway between its front and back sides. Two pairs of brackets 65, 67 are mounted on the rear of support 63. Pivot pins 69, 71 connect the front ends of boom arms 35, 37 to brackets 65, 67 respectively. A pair of brackets 73 on support 63, located between brackets 65, 67 and above pivot pins 69, 71 pivotally receives one end of a hydraulic cylinder 75. The other end of the cylinder 75 is pivotally mounted to brackets 77 on a cross-brace 79 extending between boom arms 35, 37 as shown in FIG. 2. Hydraulic cylinder 75 pivots platform 59 relative to boom arms 35, 37 about pivot pins 69, 71.

The circular saw 17 is rotatably mounted beneath base 61 to platform 59, and parallel to it, by a drive shaft 81 as shown in FIG. 4. The drive shaft 81 extends up through base 61 to a motor 83 mounted on top of the base 61. The motor 83 is enclosed for protection by a cover 85, mounted on base 61. The base 61 is very generally square in shape, when viewed from the top, with one forward corner portion of the base, equal to about one quarter of the square base area, removed to provide an opening 87 exposing about a quarter of the saw 17, as shown in FIG. 2. The exposed portion of the saw 17 is substantially covered, except for its outer periphery, with a butt plate 89. The butt plate 89 lies closely adjacent to the upper surface of the saw 17 and is located slightly below and parallel to the base 61. The butt plate 89 is joined to the base 61 with a vertical side wall 91 following the edge 93 of base 61 defining the opening 87. The teeth 95 of the saw 17 project just past the butt plate 89 and are set to cut a kerf 97 in a tree wide enough to receive the butt plate 89 as shown in FIG. 4. The remainder of the outer periphery of the base 61, except for edge 93, defining opening 87, has a downwardly extending protective wall 101 enclosing the remainder of the saw 17. The exposed portion of the saw is on both the "forward" side 102 and the "leading" side 103 of the base 61. The "leading" side is defined as the side of the base 61 facing in the direction that the base 61 moves when the apparatus 3 rotates on the vehicle 5. The side 105 of the base 61 opposite to side 103 is defined as the "trailing" side.

An abutment member 107 is provided on the felling platform 59. The abutment member 107 is mounted on the support member 63 which extends across the base 61 between its sides 103, 105, just rearwardly of the base opening 87. The abutment member 107 is on the "forward" side of the support member 63 and is located a short distance above the base 61 and parallel to it. The forward edge 111 of the abutment member 107 is slightly concavely curved while being generally parallel with the "forward" side 102 of the base 61 and just overlies the opening 87 in the base 61.

The pusher arm 23 is also mounted on the felling platform 59 and comprises an upright arm 113 pivotally mounted at its lower end to the forward, trailing corner of the cover 85. A pivot member 115 connects the lower end of the arm 113 to brackets 117 on the cover 85. A cross arm 119 extends generally transversely from the upper end of the upright arm 113 across the platform 59 over its forward portion and in front of the butt plate 87. A hydraulic cylinder 121 is pivotally connected at one end to brackets 123 on the support member 63 adjacent its trailing side 125. The other end of the cylinder 121 is pivotally connected to brackets 127 on the upright arm 113 a short distance above its lower end. Operation of the cylinder 121 pulls the arm 23 rearwardly about pivot member 115.

Stop means are mounted on the platform 59 to prevent cut trees, pushed into the basket 21 by the pusher arm 23, from sliding forwardly out of the basket 21. The stop means comprise an upright stop plate 131 mounted on the forward portion of the cover 85 and laterally offset from the butt plate 89 in the trailing direction. Vertical reinforcing members 133 strengthen the stop plate 131.

The basket 21, as shown in FIGS. 2, 5 and 6 comprises a main beam 141 extending longitudinally of the apparatus 3. The beam 141 is located between the boom memb ers 31, 33 and parallel to them. The beam 141 slopes upwardly at a shallow angle from its forward end, and is generally longitudinally centered over the base 9. The beam 141 is pivotally mounted to pairs of brackets 143, 145 on the base 9 by pivot members 147, 149 and cooperating brackets 151, 153 on the beam 141. The beam 141 supports a floor 155 having a narrow, flat floor section 157 located over the beam 141 and a wide, upwardly-sloping floor section 159 extending from the leading edge 160 of the floor section 157. Both floor sections 157, 159 also follow the beam 141 in sloping upwardly from front to back. The basket 21 has a trailing side wall 161 extending upwardly and slightly outwardly from the trailing edge 162 of the flat floor section 157 and a leading side wall 163 extending generally upwardly from the leading edge 164 of the sloping floor section 159. Leading side wall 163 is adjacent cab 25. A hydraulic cylinder 165 is pivotally connected at one end to base 9 via brackets 167, and at its other end to the bottom of beam 141 via brackets 169. Brackets 167 are located between brackets 143, 145 and brackets 169 are located between brackets 151, 153.

When the apparatus 3 is mounted on a vehicle 5, the power supply means 19 at the rear end of the boom 7 helps to balance the felling platform 59 at the front end of the boom 7. The vehicle 1 is manoeuvered to position the forward, leading, exposed portion of the saw 17 adjacent a tree to be harvested. The platform 59 and the boom arms 35, 37 can be pivoted about horizontal axii by hydraulic cylinders 75, 43, 49 respectively to position the saw 17 generally horizontally and close to the bottom of the tree to be cut. The apparatus 3 is then rotated on the vehicle to have the saw 17, which is rotated by its drive shaft 81, cut through the tree. The cut tree lands on the butt plate 89 and the pusher arm 23 is activated by cylinder 121 to push the cut tree into the basket 21. As the pusher arm 23 is pivoted rearwardly its top cross arm 119 starts the tree felling rearwardly into the basket 21, the tree toppling over the abutment member 107 adjacent the butt plate 89. It will be noted that the tree generally falls in a radial direction relative to the axis of rotation of the apparatus 3 on the vehicle 5. When the tree falls into the basket 21, the sloping floor section 159 causes the tree to move transversely in the basket 21 toward its trailing side and onto the flat floor section 157. This moves the butt end of the tree transversely of the butt plate 89 along the top of support 63, and over the cover 85 so it does not interfere with the next tree to be cut. The trees can butt against the stop plate 131 which prevents them from sliding forwardly pas the platform 59 and interfering with uncut trees. The basket 21 can also be tilted transversely in the trailing direction by the cylinder 165 so as to help shift the trees in the basket in the trailing direction and away from the butt plate 89. Once the basket 21 has a load of trees, the vehicle is driven to a collection site and the basket 21 is tipped sideways in the trailing direction by cylinder 165 to unload the trees.

The vehicle 5 preferably employed in the machine 1 has a chassis 15 with a bogie wheel suspension on each side as shown in FIGS. 1 and 4. A first support beam 175 is mounted by a pivot 177 to one side 179 of the chassis 15 and a second support beam 181 is mounted by a pivot 183 to the other side 185 of the chassis 15. The first and second pivots 177, 183 are mounted at the center of their respective beams 175, 181 to the center of the chassis 15. Each beam 175, 181 carriers at least one wheel 187 at each end.

A pair of hydraulic cylinders 191, 193 are associated with each beam 175, 181. One cylinder 191 extends forwardly and is pivotally attached at one end to brackets 195 on the beam 175, 181 just forward of their pivots 177, 183. The other end of cylinder 191 is pivotally attached to brackets 197 on the forward part of the chassis 15. The other cylinder 193 extends rearwardly and is pivotally attached at one end to brackets 199 on the beams 175, 181 just rearwardly of their pivots 177, 183. The other end is pivotally attached to brackets 201 on the rear part of the chassis 15. The two cylinders 191, 193 associated with each beam 175, 181 allow the chassis 15, and thus the apparatus 3 carried by the chassis 15, to be moved to a more level position when the vehicle is working on uneven ground.

While the apparatus 3 has been described with the basket 21 mounted independently of the boom 7 on the base 9, it is also contemplated that the basket 21 could be mounted directly on the boom 7 with means to tilt the basket 21 sideways relative to the boom 7.

It is also contemplated that the tree cutting and collecting apparatus could be modified to have two circular saws mounted side-by-side at the front of the boom. One saw would be arranged to cut trees when the apparatus was swung in one direction, and the other saw would cut trees when the apparatus was swung in the other direction. The trees cut by both saws would be collected in a single basket on the apparatus.

The vehicle 5, with its levelling arrangement, can be used in other machines and need not be limited to use in the specific tree cutting and collecting machine described.

I claim:

1. A tree cutting and collecting apparatus having a base, a boom fixedly mounted on the base and projecting past the base in two opposed directions, a circular saw mounted at one end of the projecting boom and arranged to cut trees with a forward, leading portion of the saw, a tree collecting basket on the base extending generally parallel to the boom, pusher means at the one end of the boom adjacent the saw for use in toppling trees cut by the saw into the collecting basket, and power supply means mounted on the other end of the projecting boom.

2. A tree cutting and collecting vehicle having: a chassis; running gear mounted on the bottom of the chassis; a mounting base rotatably mounted on the chassis for rotation about an upright axis; a boom fixedly mounted on the base and projecting forwardly of the chassis; a felling platform mounted at the forward end of the boom; a circular saw fixedly mounted on the platform for rotation about an upright axis; tree collecting means mouned on the boom and located generally central with respect to the upright axis, the tree collecting means located above the boom and extending generally parallel to the boom, and sloping forwardly and downwardly toward the felling platform; means for directing each tree cut by the circular saw to fall into the tree collecting means; and stop means mounted on the felling platform for preventing the cut trees collected in the collecting means from sliding forwardly of the felling platform.

3. A tree cutting and collecting vehicle having: a chassis; running gear mounted on the bottom of the chassis; a mounting base rotatably mounted on the chassis for rotation about an upright axis; a boom fixedly mounted on the base and projecting forwardly of the chassis, the boom also projecting rearwardly of the chassis with the rearward end of the boom carrying power supply means for the vehicle; a felling platform mounted at the forward end of the boom; a circular saw fixedly mounted on the platform for rotation about an upright axis; tree collecting means mounted on the boom and located generally central with respect to the upright axis, the tree collecting means located above the boom and extending generally parallel to the boom, and sloping forwardly and downwardly toward the felling platform; and means for directing each tree cut by the circular saw to fall into the tree collecting means.

* * * * *